United States Patent
Fujimoto et al.

(10) Patent No.: US 11,402,816 B2
(45) Date of Patent: Aug. 2, 2022

(54) NUMERICAL CONTROL DEVICE

(71) Applicant: FANUC CORPORATION, Yamanashi (JP)

(72) Inventors: Hiroyuki Fujimoto, Yamanashi (JP); Nobuaki Aizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 100 days.

(21) Appl. No.: 16/929,623

(22) Filed: Jul. 15, 2020

(65) Prior Publication Data
US 2021/0063993 A1    Mar. 4, 2021

(30) Foreign Application Priority Data

Aug. 30, 2019 (JP) .............................. JP2019-158458

(51) Int. Cl.
G05B 19/402 (2006.01)
(52) U.S. Cl.
CPC .. G05B 19/402 (2013.01); *G05B 2219/39573* (2013.01)
(58) Field of Classification Search
CPC ................. G05B 19/402; G05B 2219/39573
See application file for complete search history.

(56) References Cited

U.S. PATENT DOCUMENTS

| | | | | |
|---|---|---|---|---|
| 3,878,983 A * | 4/1975 | Hamill, III | ....... | G05B 19/40931 700/180 |
| 4,070,608 A * | 1/1978 | Rosshirt | ........... | G05B 19/41 318/572 |
| 4,133,233 A * | 1/1979 | Pearl | .......... | B26D 7/12 83/13 |
| 4,527,808 A * | 7/1985 | Hiestand | ........... | B23B 31/16254 279/132 |
| 4,837,703 A * | 6/1989 | Kakazu | .............. | G05B 19/4061 700/176 |
| 5,282,143 A * | 1/1994 | Shirai | ..................... | G06T 17/00 700/182 |
| 5,329,457 A * | 7/1994 | Hemmerle | .......... | G05B 19/4015 318/572 |

(Continued)

FOREIGN PATENT DOCUMENTS

| | | | |
|---|---|---|---|
| JP | 2005271148 A | * | 10/2005 |
| JP | 4867876 B2 | | 2/2012 |
| KR | 20170124768 A | * | 11/2017 |

*Primary Examiner* — Ronald D Hartman, Jr.
(74) *Attorney, Agent, or Firm* — Studebaker & Brackett PC

(57) ABSTRACT

A numerical control device according to an aspect of the present disclosure controls a machine tool that machines a workpiece by way of a tool in accordance with a machining program, and includes: an offset setting unit which decides an offset direction and an offset amount with an orientation of the tool as a reference, for every tool; a test-running path calculation unit which calculates a test-running movement path of the tool obtained by offsetting by the offset amount in the offset direction from a machining movement path of the tool designated by the machining program; and an operating mode selection unit which selects either one of a machining operation mode of causing the tool to move following the machining movement path, and a test-run mode of causing the tool to move following the test-running movement path.

3 Claims, 2 Drawing Sheets

(56) References Cited

U.S. PATENT DOCUMENTS

| | | | | |
|---|---|---|---|---|
| 5,923,560 A | * | 7/1999 | Ozaki | G05B 19/404 |
| | | | | 700/175 |
| 2002/0189120 A1 | * | 12/2002 | Kaneda | B23Q 17/22 |
| | | | | 33/636 |
| 2003/0187624 A1 | * | 10/2003 | Balic | G05B 19/4099 |
| | | | | 703/1 |
| 2004/0181307 A1 | * | 9/2004 | Hirai | G05B 19/4103 |
| | | | | 700/194 |
| 2007/0189421 A1 | * | 8/2007 | Taniguchi | G01D 5/2448 |
| | | | | 375/332 |
| 2009/0294511 A1 | * | 12/2009 | Fleming | B23K 20/125 |
| | | | | 228/103 |
| 2016/0259317 A1 | * | 9/2016 | Peters | G05B 19/402 |
| 2017/0123820 A1 | * | 5/2017 | Nishi | B25J 9/1656 |
| 2018/0029183 A1 | * | 2/2018 | Yellin | B23Q 11/1076 |
| 2019/0033830 A1 | * | 1/2019 | Koyama | G05B 19/184 |
| 2019/0217434 A1 | * | 7/2019 | Adachi | B23Q 11/10 |
| 2019/0219987 A1 | * | 7/2019 | Kelkar | B23Q 1/4866 |
| 2019/0361420 A1 | * | 11/2019 | Sasaki | G05B 19/404 |
| 2020/0348644 A1 | * | 11/2020 | Guerin | G05B 19/404 |
| 2021/0181712 A1 | * | 6/2021 | Ozeki | G05B 19/4097 |
| 2021/0200179 A1 | * | 7/2021 | Aizawa | G05B 19/4069 |
| 2021/0356932 A1 | * | 11/2021 | Kono | G05B 19/402 |

\* cited by examiner

NUMERICAL CONTROL DEVICE

This application is based on and claims the benefit of priority from Japanese Patent Application No. 2019-158458, filed on 30 Aug. 2019, the content of which is incorporated herein by reference.

BACKGROUND OF THE INVENTION

Field of the Invention

The present invention relates to a numerical control device.

Related Art

A machining system that includes a machine tool which machines a workpiece, and a numerical control device which controls the machine tool in accordance with a machining program has been widely used. In such a machining system, in order to confirm whether the machining program is appropriate before actually machining a workpiece, the machine tool may be operated experimentally so as to cause the tool to move to a position not acting (contacting) on the workpiece.

Generally, by temporarily changing the setting value for the length of the tool (distance between chuck and cutting edge), it is possible to configure so that the tool does not interfere with the workpiece by moving to a retracted position from a position in accordance with the machining program. However, since the cutting-in direction of the tool differs from the direction linking the chuck and cutting edge depending on the type of tool, it may not be possible to avoid interference of the tool with the workpiece even if changing the setting value for the length of the tool. In addition, although it is necessary to return the setting value of the length of the tool back to the appropriate value after changing the setting value for the length of the tool and performing test running, there is a risk of no longer being able to appropriately machine by forgetting this operation or setting the setting value for the length of the tool to the wrong value.

In order to easily perform test running of a machine tool, a numerical control device has been proposed which includes a movement amount calculation means for calculating a movement amount which is the difference between the movement start position and movement end position, and includes an offset amount decision means for deciding the largest movement amount among the movement amounts calculated by the movement amount calculation means as the offset amount, for one or each of a plurality of cutting operations performed according to a cutting instruction of the machining program (for example, refer to Patent Document 1).

Patent Document 1: Japanese Patent No. 4867876

SUMMARY OF THE INVENTION

With the method described in Patent Document 1, the longest distance among the movement amounts in the Z axis is defined as the offset amount of the tool (retraction amount from position in accordance with the machining program). However, with such a method, for example, in a machine tool which makes complex operations such as a 5-axis machining device, there is a risk of not being able to appropriately avoid interference of the tool to the workpiece. For this reason, a numerical control device has been desired that can easily and reliably perform test running which does not allow the tool to interfere with the workpiece.

A numerical control device according to an aspect of the present disclosure controls a machine tool that machines a workpiece by way of a tool in accordance with a machining program, and includes: an offset setting unit which decides an offset direction and an offset amount with an orientation of the tool as a reference, for every tool; a test-running path calculation unit which calculates a test-running movement path of the tool obtained by offsetting by the offset amount in the offset direction from a machining movement path of the tool designated by the machining program; and an operating mode selection unit which selects either one of a machining operation mode of causing the tool to move following the machining movement path, and a test-run mode of causing the tool to move following the test-running movement path.

According to the numerical control device related to the present disclosure, it is possible to easily and reliably perform test running which does not allow the tool to interfere with the workpiece.

DETAILED DESCRIPTION OF THE INVENTION

Figure 1:
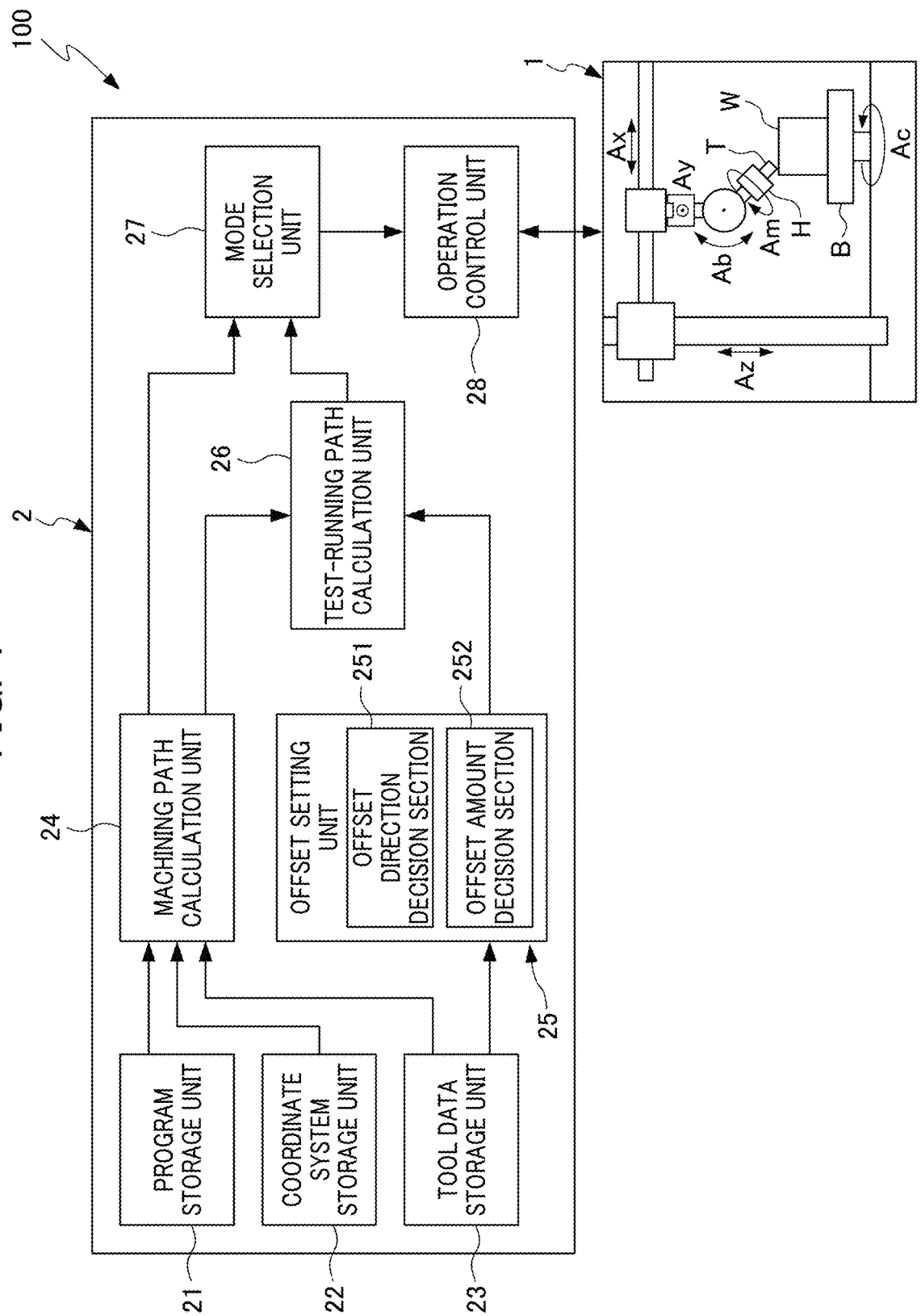
FIG. 1 is a schematic diagram showing the configuration of a machining system which includes a numerical control device of an embodiment of the present disclosure.

Hereinafter, an embodiment of the present disclosure will be explained while referencing the drawings. FIG. 1 is a schematic diagram showing the configuration of a machining system 100 including a machine tool 1 and a numerical control device 2 of an embodiment of the present disclosure.

The machine tool 1 is a device which cuts a workpiece W, by causing the tool T which is rotated by a spindle Am to operate on a workpiece W. The machine tool 1 can be established as a device which cuts the workpiece W retained on a table B, for example, by the tool T retained by a machining head H, and has a plurality of drive axes capable of relative moving the tool T (machining head H) in relation to the workpiece W (table B). Although the specific axis configuration of the machine tool 1 is not particularly limited, as an example, the machine tool 1 can be established as a 5-axis machining device having linear axes Ax, Ay, Az in the orthogonal x direction, y direction and z direction; a rotary axis Ab parallel to the linear axis Ay; and a rotary axis Ac parallel to the linear axis Az, as the plurality of drive axes.

The numerical control device 2 controls the spindle Am and drive axes Ax, Ay, Az, Ab, Ac of the machine tool 1, in accordance with the machining program. This numerical control device 2, for example, can be realized by causing the appropriate control program to be executed in a computer device having a CPU, memory, I/O interface, etc. The numerical control device 2 may be configured so as to communicate with a management server which manages a plurality of machining systems 100.

The numerical control device 2 includes: a program storage unit 21, a coordinate system storage unit 22, a tool data storage unit 23, a machining path calculation unit 24, an offset setting unit 25, a test-running path calculation unit 26, an operating mode selection unit 27, and an operation control unit 28. It should be noted that these constituent elements are distinguished in a functional manner, and may not necessarily be clearly distinguishable in the physical configuration and program configuration.

The program storage unit 21 stores machining programs. The program storage unit 21 stores a plurality of machining programs, and may be configured so as to select from among the plurality of stored machining programs a machining program designated by the user or the management server. The configuration of the program storage unit 21 can be established as the same configuration as that of a conventional numerical control device.

The coordinate system storage unit 22 stores the coordinate system of the workpiece W. The numerical control device 2 thereby becomes able to convert between the coordinate system of the machine tool 1 and the coordinate system of the workpiece W. The configuration of the coordinate system storage unit 22 can be established as the same configuration as that of a conventional numerical control device.

The tool data storage unit 23 stores information about the tool T required for machining of the workpiece W, such as the type of tool T, flute length, and range of suitable cutting speeds. The tool data storage unit 23 may store the numerical value of the offset amount and the offset direction adopted as is in the offset setting unit 25 described later. More specifically, the tool data storage unit 23 can be established as a configuration that stores a table associating the number or ID of a plurality of tools T, and a plurality of sets of information required in machining.

The machining path calculation unit 24 calculates the movement path of the tool T in accordance with a machining program stored in the program storage unit 21. More specifically, the machining path calculation unit 24 analyzes a machining program, and calculates the position and posture of the tool T at every time designated by the machining program, and the positions of the drive axes Ax, Ay, Az, Ab, Ac at every time, for realizing this.

The offset setting unit 25 has an offset direction decision section 251 for deciding an offset direction Dd, which is a direction in which causing the tool T to retract from the machining movement path upon test running with the orientation of the tool T (orientation of rotary axis matching the spindle Am in the present embodiment) as a reference, for every tool T; and an offset amount decision section 252 which decides an offset amount Da, which is a distance by which causing the tool T to retract from the machining movement path.

The offset direction decision section 251 sets the offset direction stored in the tool data information unit 23 for the tool T current being used as the offset direction of this tool T. In addition, in the case of the offset direction not being stored in the tool data storage unit 23, it may be configured so as to define the offset direction as the rotary axis direction of the tool T (direction of spindle Am). With many tools T, since offsetting in the rotary axis direction is appropriate, in the case of the offset direction being the rotary axis direction, it is possible to improve the convenience to the user by making input thereof omittable.

The offset direction decision section 251 may decide the offset direction Dd of the tool T according to the type of tool T. In other words, the offset direction decision section 251 may be configured so as to decide the offset direction Dd of the tool T, according to the type of tool T stored by the tool data storage unit 23. For this reason, the offset direction decision section 251 may store a table indicating the relationship between the type of tool T and the offset direction Dd.

Figure 2:
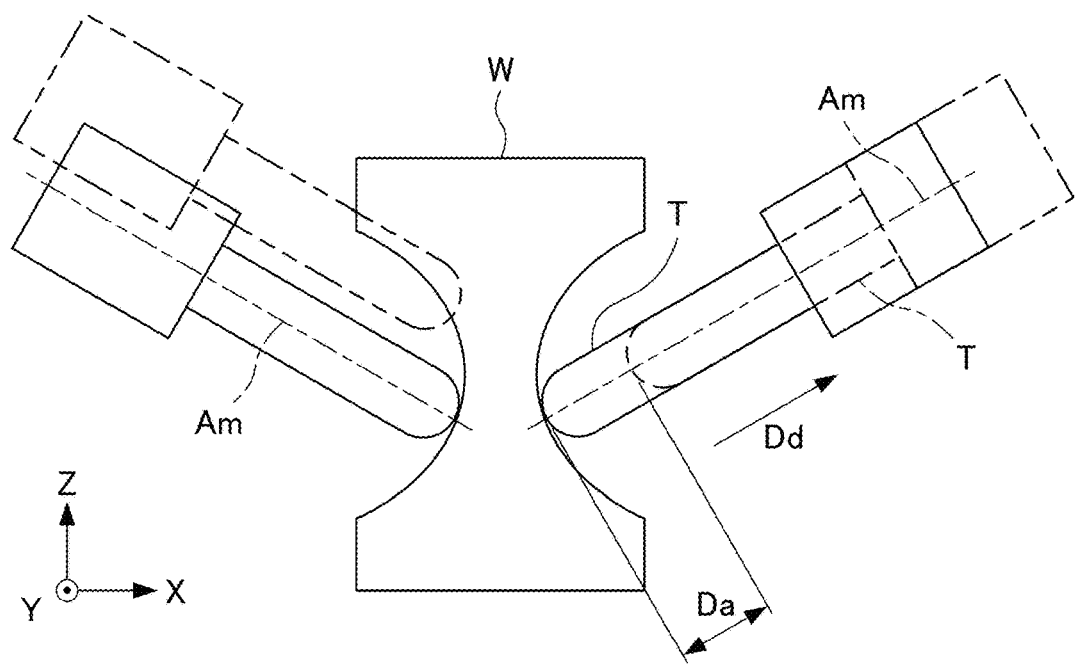
FIG. 2 is a schematic diagram showing the offset in a case of a tool in the machining system of FIG. 1 being a ball endmill.

As a specific example, in the case of the tool T being a ball end mill as shown in FIG. 2, the offset direction decision section 251 preferably sets the offset direction Dd as the direction of the rotary axis of the tool T (i.e. spindle Am). Particularly in a case of the machine tool 1 being a 5-axis machine device, when the tool T is a ball end mill, there is a risk of the tool T interfering with the workpiece W even when offsetting the tool T in the z direction following the vertical linear axis Az, as shown on the left side of the drawing. Therefore, as shown on the right side of the drawing, it is possible to prevent interference of the tool T with the workpiece W, by offsetting the tool T to the direction of the rotary axis (Am) of the tool T.

Figure 3:
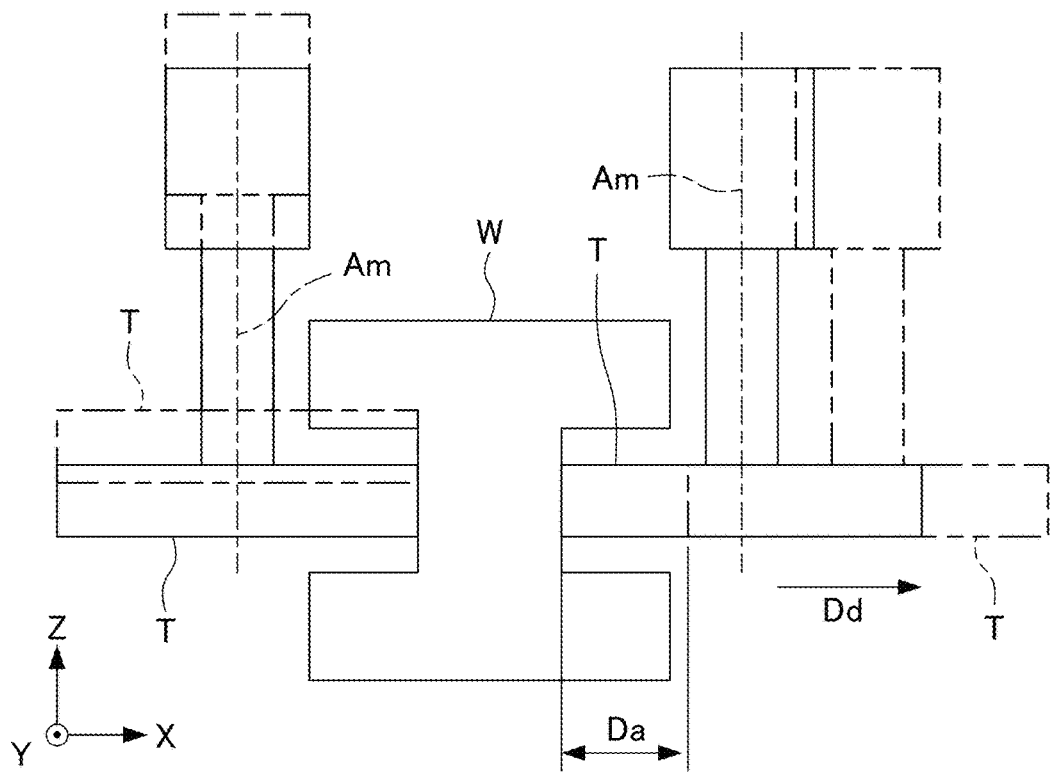
FIG. 3 is a schematic diagram showing the offset in a case of the tool in the machining system of FIG. 1 being a side milling cutter.

In addition, in a case of the tool T being a face mill as shown in FIG. 3, the offset direction decision section 251 preferably sets the offset direction Dd as a direction perpendicular to the rotary axis (Am) of the tool T. In the case of the tool T being a face mill, as shown on the left side of the drawing, there is a risk of the tool T interfering with the workpiece even when offsetting the tool T to the direction of the rotary axis (Am) of the tool T. Therefore, as shown on the right side of the drawing, it is possible to prevent interference of the tool T with the workpiece W, by offsetting the tool T in a direction perpendicular to the rotary axis (Am) of the tool T.

The offset amount decision section 252 analyzes the machining program and calculates a cutting-in amount, and may set the offset amount Da of the tool T as the value of the cutting-in amount or more; however, it may decide the offset amount Da of the tool T according to the flute length of the tool T. More specifically, the offset amount decision section 252 can set the offset amount Da as the flute length of the tool T or a value arrived at by multiplying a predetermined coefficient (safety factor) by the flute length. In machining in which the number of cuts is one time as in finish machining, since the cutting-in amount of the tool T cannot be the flute length or more, the cutting-in amount of the tool T in the machining program is set to no more than the flute length of the tool T. For this reason, so long as setting the offset amount to at least the flute length of the tool T, it is possible to configure so that the tool T will not interfere with the workpiece W.

The test-running path calculation unit 26 calculates a test-running movement path of the tool T arrived at by offsetting by the offset amount Da decided by the offset setting unit 25, in the offset direction Dd decided by the offset setting unit 25, from the machining movement path calculated by the machining path calculation unit 24. The test-running path calculation unit 26 decides the offset direction Dd at every time of the machining movement path, based on the posture of the tool T for every time specified by the machining path calculation unit 24. Since the optimum offset direction Dd is selected according to the posture of the tool T, it is thereby possible to reliably prevent interference of the tool T with the workpiece W during test running.

The operating mode selection unit 27 selects either one of a machining operation mode of machining the workpiece W by causing the tool T to move following the machining movement path calculated by the machining path calculation unit 24, and a test-running mode of causing the tool T to move so as not to contact the workpiece W following the test-running movement path calculated by the test-run path calculation unit 26. It is thereby possible to easily switch between test running which causes the tool T to move by offsetting so as not to contact the workpiece W, and machining operation which cuts the workpiece W by the tool T, without performing work such as a change of setting values.

The operation control unit 28 generates a command signal inputted to the machine tool 1, so as to perform machining on the workpiece W by causing the tool T to move following the machining movement path calculated by the machining path calculation unit 24, or test running which causes the tool T to move so as not to contact the workpiece W, following the test-running movement path calculated by the test-running path calculation unit 26. The configuration of the operation control unit 28 can be established as the same configuration as that of a conventional numerical control device.

Since the offset setting unit 25 decides the offset direction Dd with the direction of the tool T as a reference for every tool T, the numerical control device 2 can perform test running by appropriately preventing interference of the tool T with the workpiece W. In addition, the offset setting unit 25, due to deciding the offset amount Da depending on the tool T, can set the offset amount Da of the tool T as the necessity minimum size; therefore, it is possible to more easily confirm the appropriateness of the machining program.

Although an embodiment of a numerical control device according to the present disclosure has been explained above, the numerical control device according to the present disclosure is not to be limited to the aforementioned embodiment. In addition, the effects described in the aforementioned embodiment are merely listing the most preferred effects produced from the numerical control device according to the present disclosure, and the effects from the numerical control device according to the present disclosure are not limited to those described in the aforementioned embodiment.

The numerical control device according to the present disclosure may be configured so as to be able to select whether the test-running path calculation unit outputs the test-running movement path in which the machining movement path calculated by the machining path calculation unit is offset, or the test-running path calculation unit outputs the machining movement path calculated by the machining path calculation unit as is, by the machining path calculation unit and test-running path calculation unit being connected in parallel, and the operating mode selection unit activating or deactivating the function of the test-running path calculation unit.

The numerical control device according to the present disclosure may be adopted in order to control a machine tool which performs machining other than milling, such as lathe turning, for example.

EXPLANATION OF REFERENCE NUMERALS

1 numerical control device
21 program storage unit
22 coordinate system storage unit
23 tool data storage unit
24 machining path calculation unit
25 offset setting unit
26 test-running path calculation unit
27 operating mode selection unit
28 operation control unit
251 offset direction decision section
252 offset amount decision section
100 machining system
T tool
W workpiece

What is claimed is:

1. A numerical control device which controls a machine tool that machines a workpiece by way of a tool in accordance with a machining program, the numerical control device comprising a processor, the processor being configured to:
   decide an offset direction and an offset amount with an orientation of the tool as a reference, for every tool;
   calculate a test-running movement path of the tool obtained by offsetting by the offset amount in the offset direction from a machining movement path of the tool designated by the machining program; and
   select either one of a machining operation mode of causing the tool to move following the machining movement path, and a test-run mode of causing the tool to move following the test-running movement path.

2. The numerical control device according to claim 1, wherein the processor decides the offset amount according to a flute length of the tool.

3. The numerical control device according to claim 1, wherein the processor decides the offset direction according to a type of the tool.

* * * * *